Figure 1:
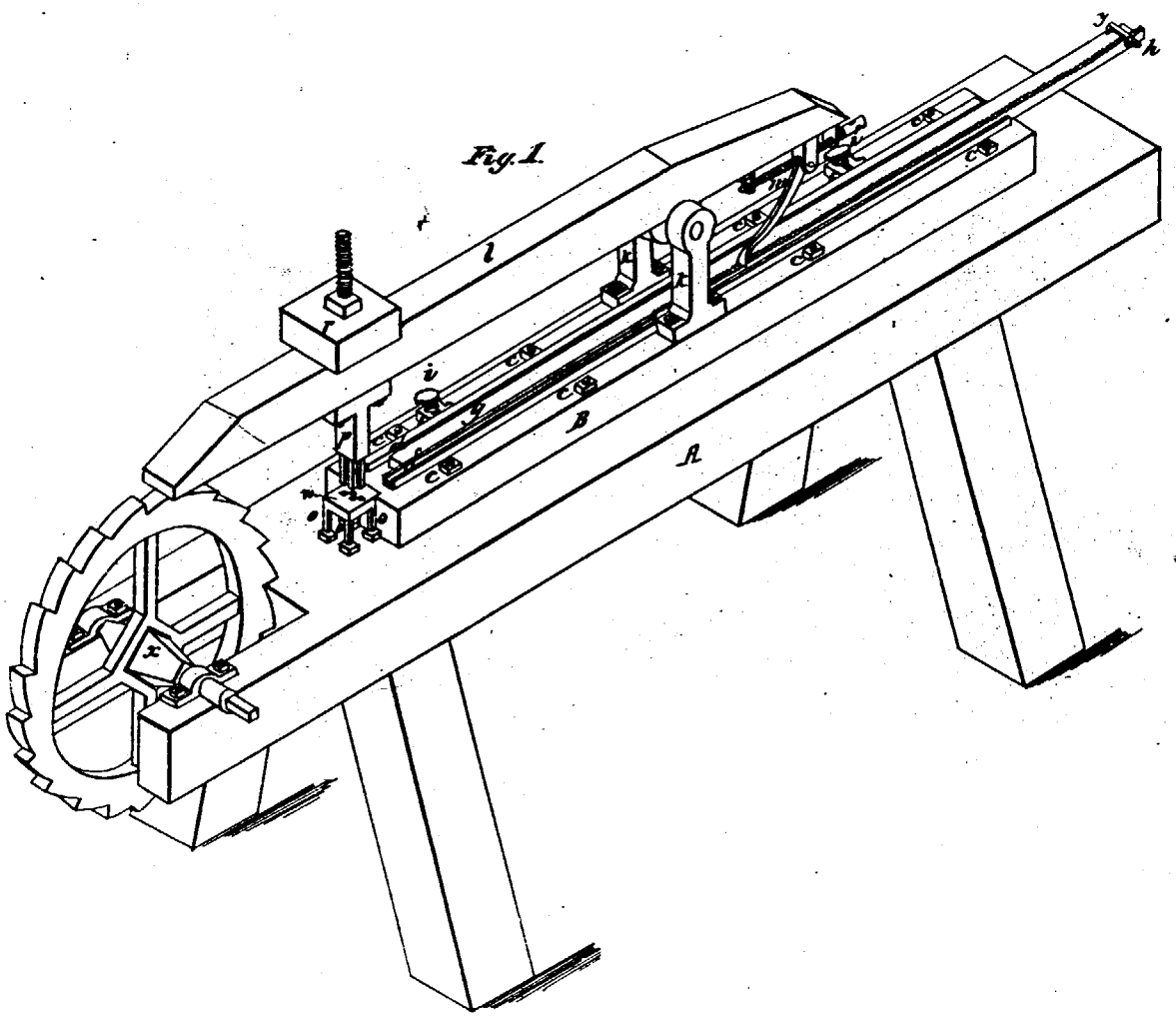
Figure 2:
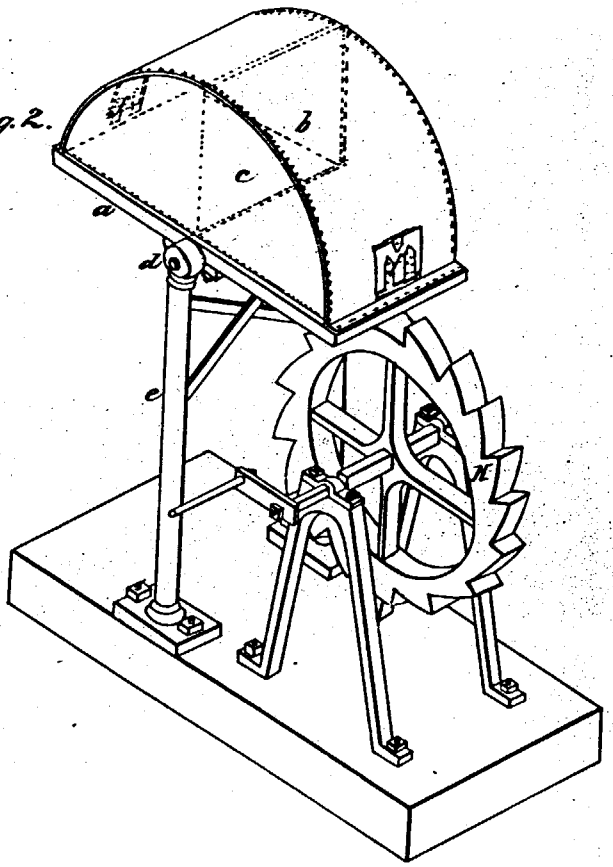
Figure 3:
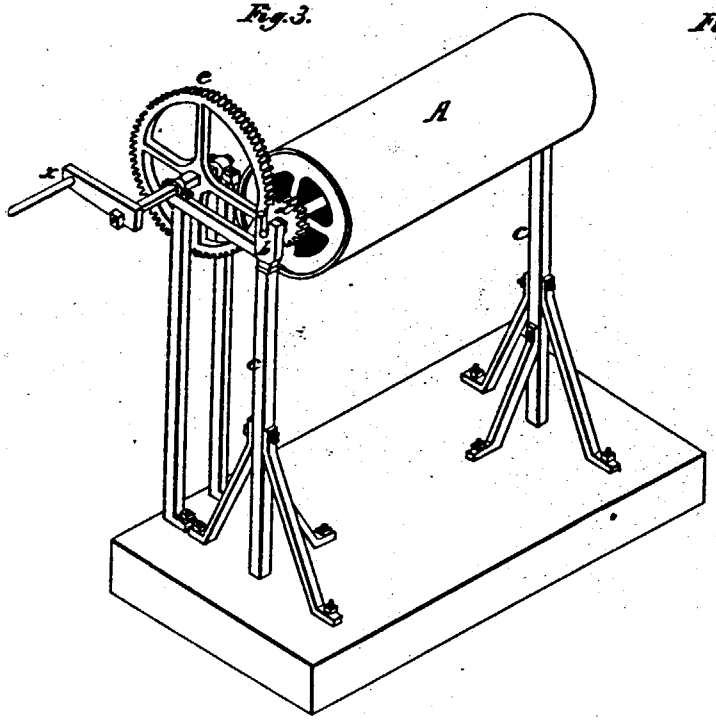

Sheet 1 - 2 Sheets.

942 X

T. Bruff,

Making Bullets and Shot,

Patented Oct. 5, 1808.

R. PETERS, PHOTO-LITHOGRAPHER, WASHINGTON, D. C.

9424

T. Bruff,

Making Bullets and Shot,

Patented Oct. 5, 1808.

R. PETERS, PHOTO-LITHOGRAPHER, WASHINGTON, D. C.

Thomas Bruff
Letters Patent.

The Schedule referred to in these Letters Patent and making part of the same containing a description in the words of the said Thomas Bruff himself of his machine for making Ball & Shot by Pressure.

---

This machine is erected on a wooden horse or bench, a plank of strong hard wood at least 5 inches wide and 4 feet long is fastened firmly to the leg. horse or bench by the screws. thin grooves of hard wood are set on it for the rack and lead bar to slide in, one side of the groove opposite to the lead bar is made to slide side ways about half an inch for the purpose of admitting the lead bar, and then is pushed in place — about the middle of the plank, are 2 strong iron bars in an upright position firmly secured by screws or rivets between them a strong iron lever works on a pivot about 6 inches above the board at the end of the lever at a proper distance to move the rack the breadth of the ball or square shot, is a ratchet moving on a screw, and by its flat point pressing against the notch of the rack at each elevation of the lever pushes it one breadth of the ball or shot towards the die and carries with it the lead bar which is held by a screw clamp at the end of the rack. The bar is thus conducted to a steel plate secured in pillars having 2 rows of square holes pierced in it just the size you wish to have your ball or shot in a square state they are just their breadth apart leaving a solid piece of the steel plate between them exactly their own size, and opposite each hole in the adjoining row is a solid part of the plate. There is a steel die secured to the lever, exactly over the holes and exactly the size and form of the holes over which in making small shot, a weight is to be set just heavy enough to push the die through the lead. The bar is raised up by a wheel 18 or 20 inches diameter working vertically and having teeth 3 inches long and half inch deep rising

9427X gradually and a sudden fall at their extremity by which the bar is sud-
denly let down and the shot pressed through the plate by the die.
After the shot are formed into squares they are put into a vessel
for rounding them. that vessel is made of a flat plate of thick
cast iron ground smooth on the inside. the plate is at least 20
inches long and 8 wide having a half circular cover of sheet
iron and a division in the middle forming 2 apartments. This
vessel is set on pivots at the middle and supported by pillars
in which the pivots work and the shot are put into each apart-
ment at doors on each end. Under one end of the plate is a wheel
about 18 inches diameter working vertically and having teeth
3 inches long and about an inch high. they slope gradually up
and fall suddenly at the extremity by which means the shot are -
sudden thrown up and lett down against the thick iron plate or
bottom which presses the most prominent parts into the main bo-
dy, and pushes it out till they become perfectly round. They are
then carried to the finishing machine which is a cylinder of iron
brass or copper about 20 inches long 8 wide, and polished inside
it works on an iron axis on iron pillars has a cog wheel attached
to the axis the teeth of which correspond with the teeth of the wheel
by which it is moved. This wheel is about 18 inches diameter, has teeth
of a common size, turning toward the cylinder and is put in
motion by a winch or handle and the shot being pressed against
the smooth sides of the cylinder as it turns are made smooth and
finished. Mills are made by water, wind, or horses Witnesses
William Thornton
Peter Wagner
Thomas Bruff.

[illegible]
JHT 741 [illegible] ([illegible], Oct 5 1808)

Drawing made [illegible]